A. HAMMERS.
MOTOR CYCLE SLEIGH.
APPLICATION FILED MAY 1, 1918.
1,306,428.
Patented June 10, 1919.
3 SHEETS—SHEET 1.
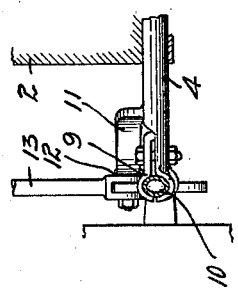
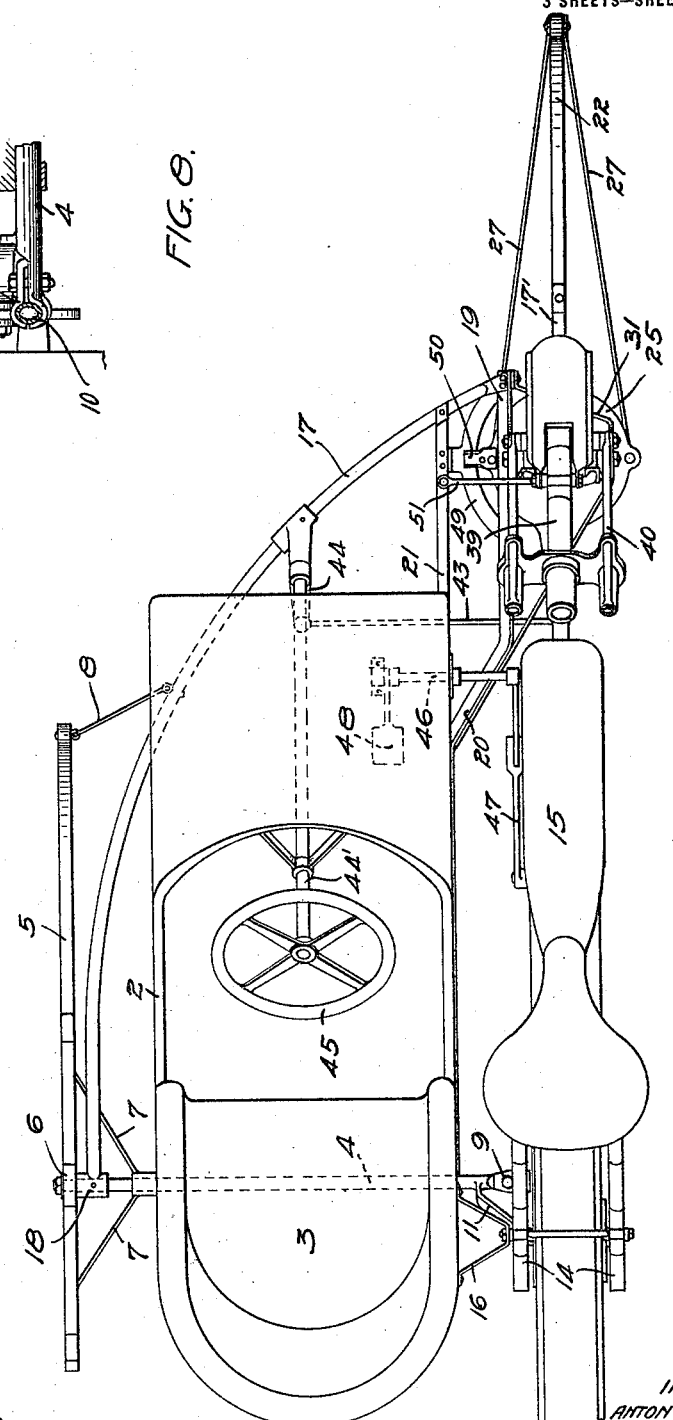
WITNESSES
INVENTOR
ANTON HAMMERS
BY
ATTORNEYS

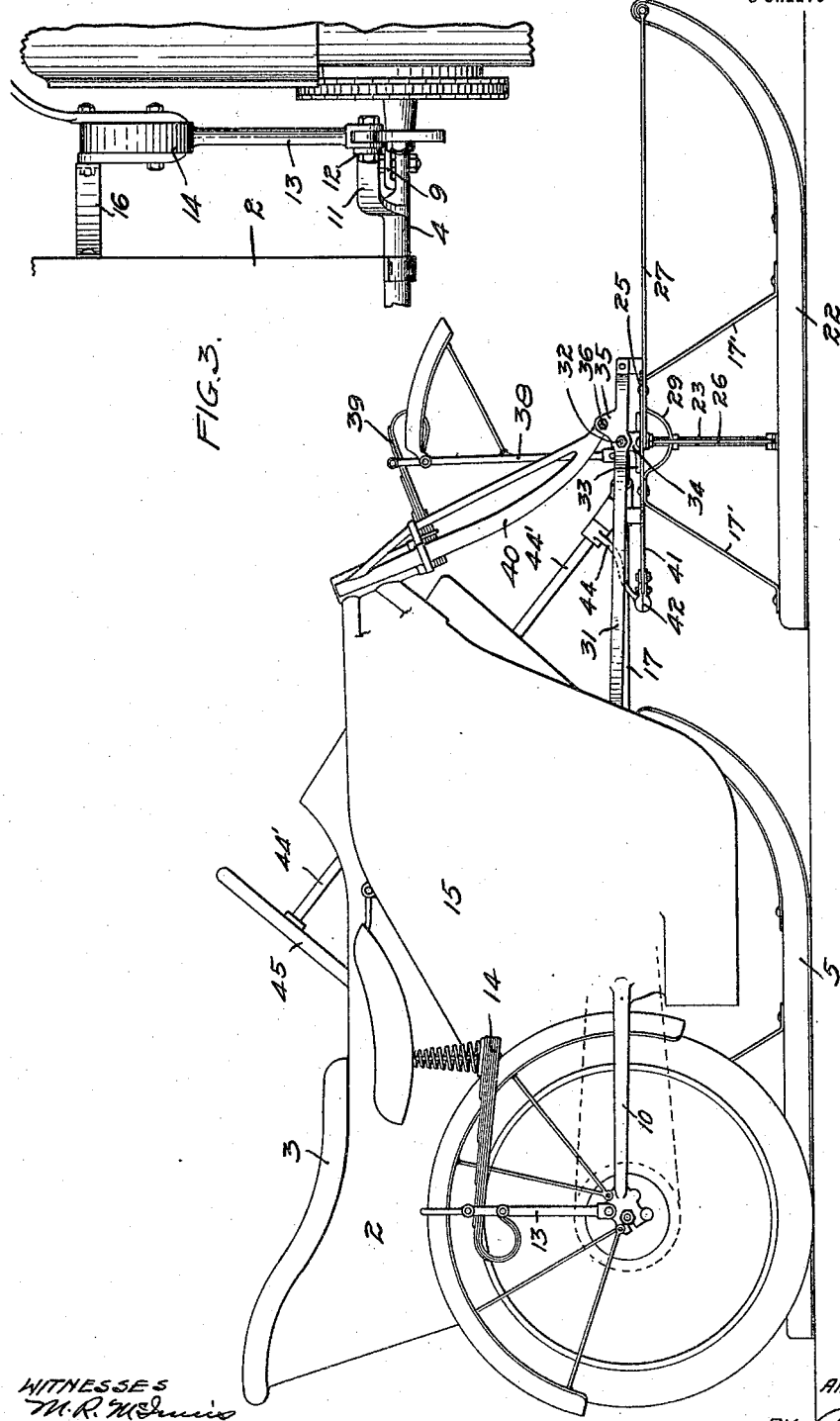

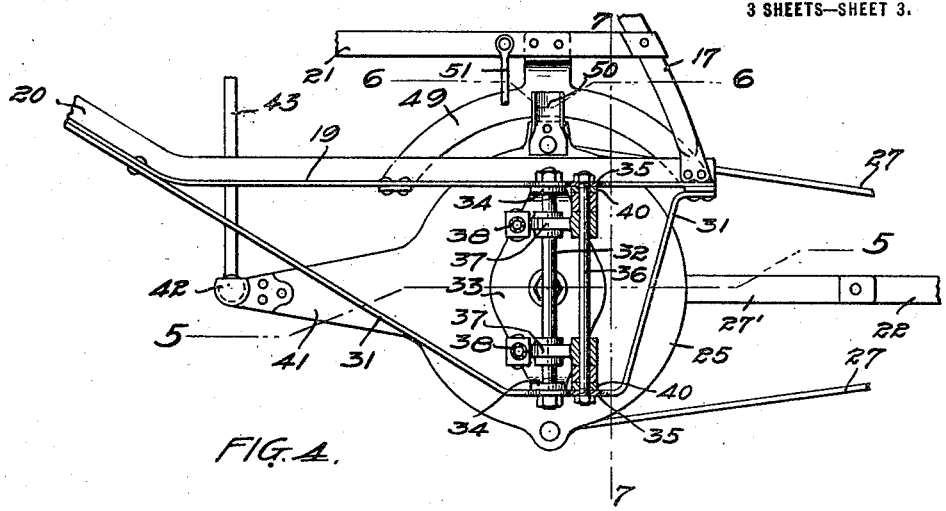
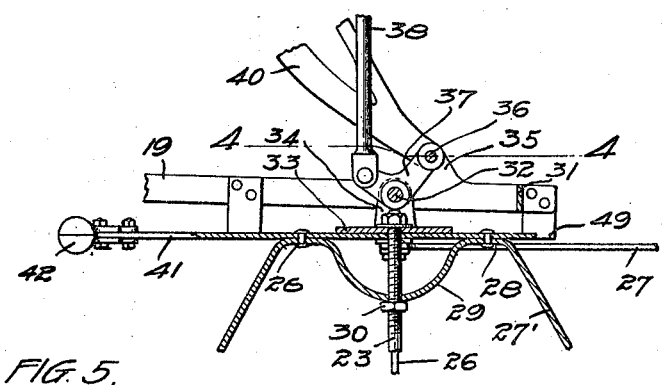
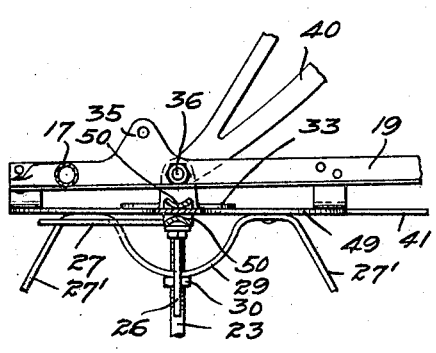
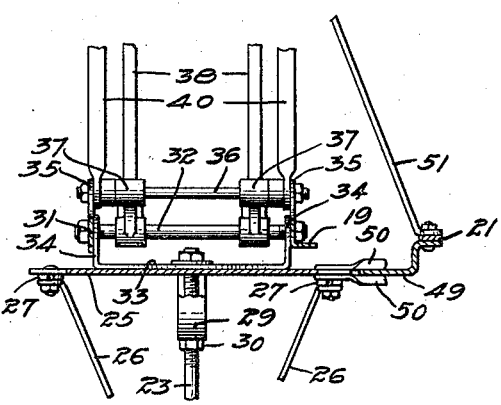

UNITED STATES PATENT OFFICE.

ANTON HAMMERS, OF DENT, MINNESOTA.

MOTOR-CYCLE SLEIGH.

1,306,428.  Specification of Letters Patent.  Patented June 10, 1919.

Application filed May 1, 1918. Serial No. 231,907.

*To all whom it may concern:*

Be it known that I, ANTON HAMMERS, a citizen of the United States, resident of Dent, county of Ottertail, State of Minnesota, have invented certain new and useful Improvements in Motor-Cycle Sleighs, of which the following is a specification.

The object of my invention is to provide a sleigh having means for attaching a motor cycle thereto for the purpose of propelling the sleigh over the snow and ice.

A further object is to provide a motor sleigh having a box or body in which the driver may sit and steer the machine in substantially the same manner as a wheeled motor vehicle would be guided.

Other objects of the invention will appear from the following detailed description.

The invention consists generally in various constructions and combinations, all as hereinafter described and particularly pointed out in the claims.

In the accompanying drawings forming part of this specification,

Figure 1 is a plan view of a motor cycle sleigh embodying my invention,

Fig. 2 is a side elevation of the same,

Fig. 3 is a detail view, showing the manner of connecting the sleigh body to the rear of the motor cycle, Fig. 4 is a plan sectional view, taken on line 4—4 of Fig. 5, showing the manner of mounting the forward portion of the motor cycle on the guiding runner, Fig. 5 is a vertical sectional view taken on line 5—5 of Fig. 4 showing the connection between the steering mechanism and the runner, Fig. 6 is a detail view, taken on line 6—6 of Fig. 4, showing the manner of connecting the single fork of the cycle to the steering mechanism, Fig. 7 is a vertical sectional view, taken on line 7—7 of Fig. 4, taken transversely of the runner, showing its position with respect to the guiding mechanism, Fig. 8 is a detail view, illustrating the manner of attaching the rear of the sleigh body to the cycle frame.

In the drawing, 2 represents the body of the sleigh, having a seat 3 and 4 is a shaft whereon the rear of the body is supported. 5 is the rear runner, having a bearing at 6 for the shaft 4, and 7 are braces for holding the runner in upright parallel relation with the body, while allowing it to oscillate on a transverse axis. A link 8 connects the forward end of the runner with the body 2. A clamp 9 secures the opposite end of the shaft 4 to the horizontal fork 10 of the motor cycle and a bracket 11 is outwardly turned from the end of the shaft 4 and is secured at 12 to the lower end of an upright fork 13 of the cycle. This fork 13 is of ordinary construction and supports the rear of the spring 14 on which the motor cycle frame 15 is carried. A brace 16 connects the upper portion of the fork 13 with the body 2 and thereby the rear of the body and the corresponding portion of the motor cycle are readily held in parallel relation. A rail 17 consisting preferably of a curved section of pipe, is journaled at 18 on the axle 4 and extends forwardly therefrom under the forward end of the body 2 to form a support therefor and to a point in front of the motor cycle where it is secured to a rail 19 which has a rearwardly extending offset 20 secured to the side wall of the body 2. A brace bar 21 is secured at its forward end to the rail 7 and extends backwardly therefrom beneath the body and is secured thereto and to the bar 20. 22 represents the forward runner and 23 is an upright shaft journaled at 24 on the runner and passing through the plate 25. Braces 26 connect this plate with the runner and rods 27 extend from the plate 25 on opposite sides of its pivot to the forward ends of the runner for swinging it from side to side when the plate 25 is oscillated. A bar 27' is secured at 28 to the plate 25 and has a curved middle portion 29 through which the shaft 23 passes. A lock nut 30 is mounted on the said shaft for engaging the curved portion 29 and taking up any lost motion that may have occurred through wear of the connections between the plate 25 and the brace bar 27'.

A brace bar 31 is secured to the bar 19 and a shaft 32 is mounted at one end in said bar and at its opposite end in the vertical flange of the bar 19. A plate 33 is pivoted on the upper end of the shaft 23 and has upwardly turned lugs 34 through which the shaft 32 passes. Lugs 35 are provided on the bars 19 and 31 in which a shaft 36 is secured and bell cranks 37 are mounted on the shaft 36 and when the nuts of this shaft are tightened, the bars 19 and 31 and the shaft 36 will be firmly secured together. The forward runner, however, will be free to oscillate on a vertical axis through its connection with the plate 33 and the fork of the cycle.

The plate 25 has a rearwardly extending arm 41 and a ball and socket joint 42 is provided between this arm and a rod 43 which extends across the machine and is connected to an arm 44 on the steering post 44' mounted for rotation on the rail 17 and provided with a steering wheel 45. A shaft 46 is journaled in the wall of the body 2 and connected to the brake control lever 47 and provided with the usual treadle 48.

For holding the forward runner against lateral sagging, I prefer to provide a guide rail 49 secured to the bar 21 and the rail 19 and on the plate 25 I mount clips 50 which straddle the guide rail and slide thereon as the plate 25 is rotated to swing the runner from side to side and steer the machine. A brace 51 is secured to the bar 21 and to the rod 38 for holding the runner supporting frame in its proper position with respect to the frame of the motor-cycle.

When a motor-cycle is used which does not have the spring 39 and its supporting rod 38, the fork 40 may be mounted directly upon the shaft 32, as indicated in Fig. 6.

I claim as my invention:

1. In combination with a motor cycle, a shaft having one end secured to the rear portion of the cycle frame, a support mounted on the other end of said shaft, a body having its rear portion carried by said shaft, a frame secured to the forward portion of said body and having a bearing thereon for the motor cycle fork, a guiding support swiveled on said frame, a supporting rail extending diagonally from said frame beneath said body and having a bearing on said shaft adjacent said first named support, and a steering device mounted in said body and connected with said guiding support below said fork for oscillating it on said frame.

2. The combination, with a motor cycle, of a body supported at one side thereof, a supporting runner on the opposite side of said body from said motor cycle, a guiding runner whereon the forward fork of said motor cycle is mounted, a frame connecting said guiding runner with said body, a steering post mounted in said body for rotation by the driver seated therein, and mechanism operatively connecting said steering post with said guiding runner whereby the driver, by the movement of said post, may oscillate said guiding runner to guide the machine.

3. In combination with an axle, a body supported thereon, a motor cycle having its rear portion connected with one end of said axle and with said body, a supporting means mounted on the other end of said axle, a rail mounted on said axle near said supporting means and projecting forwardly and forming a support for the forward portion of said body, a frame whereon the forward fork of said motor cycle is mounted, a guiding means swiveled in said frame, means connecting said frame with the forward portion of said body, and a steering post positioned within said body and having means for connection with said guiding means.

4. The combination, with a motor cycle, of an axle mounted on the rear portion thereof and projecting laterally with respect thereto, a support mounted on said axle, a body carried on said axle between said support and motor cycle, a frame having a bearing on said axle and secured to the forward portion of said body, a guiding means mounted in said frame and having a bearing for the forward fork of said motor cycle, a steering device mounted in said body and operatively connected with said guiding means below said fork, and a control treadle mounted in said body and operatively connected with the control lever of said motor cycle.

5. The combination, with a motor cycle, of an axle secured to one side thereof, and projecting laterally therefrom, a runner mounted on said axle, a sleigh body supported on said axle between said runner and motor cycle, a rail mounted on said axle adjacent cycle, a rail mounted on said axle adjacent said runner and extending diagonally therefrom to a point near the front of said motor cycle, bracing bars secured to said rail and to the forward portion of said body, a frame, and a guiding runner whereon said frame is mounted, means securing said frame and said bracing bars together for a rigid connection between them, means for mounting the forward fork of the motor cycle on said frame for oscillation of said runner to guide the machine, and a steering device for said runner.

6. The combination, with a motor cycle, of an axle secured to one side thereof and projecting laterally therefrom, a support mounted on said axle, a body mounted on said axle between said support and motor cycle, a rail mounted on said axle adjacent said support and extending therefrom to a point near the front of the motor cycle, braces secured to said rail and to the forward portion of said body, a frame, and a guiding means whereon said frame is mounted, means securing said frame and said bars together for a rigid connection between them, means for mounting the forward fork of the motor cycle on said frame for oscillation of said guiding means to guide the machine, and a steering device mounted in said body and having a transverse connection with said guiding means, whereby the occupant of said body can oscillate said guiding means to steer the machine.

7. The combination, with a motor cycle, of a car body supported at one side thereof, a guiding means whereon the forward fork of the motor cycle is mounted, a frame connecting said guiding means with said car body and allowing said guiding means to oscillate on a vertical axis independently of said body, a steering post mounted in said frame and having bearings in said car body to be rotated by the occupant of said body, an arm projecting rearwardly on said frame, a rod having a ball and socket connection with said arm at one end and connected with said steering post at the opposite end for oscillating said guiding means when said post is rotated.

8. The combination, with a motor cycle, of a car body supported at one side thereof, a plate whereon the forward fork of said motor cycle is mounted for oscillation on a vertical pivot, a support and guiding means for said plate, a frame connected with said car body support and with said fork, an arm mounted on said plate, a rod having a pivotal connection with said arm at one end and a steering device mounted in said car body for operation by the driver therein and having means connecting it with said rod for oscillating said guiding means.

In witness whereof, I have hereunto set my hand this 17th day of April, 1918.

ANTON HAMMERS.

Witnesses:
 EDW. J. STOLL,
 A. B. DWYER.

Copies of this patent may be obtained for five cents each, by addressing the "Commissioner of Patents, Washington, D. C."